United States Patent
Benz et al.

(10) Patent No.: US 6,734,952 B2
(45) Date of Patent: May 11, 2004

(54) PROCESS AND DEVICE FOR THE AUTOMATIC LOCATION OF REFERENCE MARKERS

(75) Inventors: Paul Benz, Diepoldsau (CH); Markus Geser, Goldach (CH); Roland Graf, Untereggen (CH); Bruno Pfiffner, Hochwiese (CH); Marcel Buerki, Au (CH); Marco Landert, Speicher (CH); Markus Hammerer, Fraxern (AT); Jürg Hinderling, Marbach (CH); Günther Hanns, Widnau (CH); Gerhard Bayer, Lindau (DE)

(73) Assignee: Leica Geosystems, AG, Heerbrugg (CH)

( * ) Notice: Subject to any disclaimer, the term of this patent is extended or adjusted under 35 U.S.C. 154(b) by 0 days.

(21) Appl. No.: 10/346,555

(22) Filed: Jan. 17, 2003

(65) Prior Publication Data
US 2003/0169414 A1 Sep. 11, 2003

(30) Foreign Application Priority Data
Jan. 22, 2002 (EP) .......................... 02001487

(51) Int. Cl.⁷ .......................... G01C 3/08; G01B 11/26
(52) U.S. Cl. ................. 356/5.01; 356/141.1; 356/141.5
(58) Field of Search ................ 356/5.01–5.08, 356/141.1, 141.5

(56) References Cited

U.S. PATENT DOCUMENTS

| 4,518,256 A | * | 5/1985 | Schwartz |
| 5,076,690 A | * | 12/1991 | deVos et al. |
| 5,155,542 A | * | 10/1992 | Rampolla et al. |
| 5,202,742 A | * | 4/1993 | Frank et al. |
| 5,559,322 A | * | 9/1996 | Jacoby et al. |
| 5,682,229 A | * | 10/1997 | Wangler |
| 5,815,250 A | * | 9/1998 | Thomson et al. |
| 5,898,490 A | * | 4/1999 | Ohtomo et al. |
| 6,031,606 A | | 2/2000 | Bayer et al. ............. 356/141.5 |
| 6,046,800 A | * | 4/2000 | Ohtomo |
| 6,335,789 B1 | * | 1/2002 | Kikuchi .................... 356/141.1 |

FOREIGN PATENT DOCUMENTS

| CH | 676042 A5 | 7/1988 | ............ G01C/3/02 |
| JP | 4-307387 | * 10/1992 | |

* cited by examiner

Primary Examiner—Stephen C. Buczinski
(74) Attorney, Agent, or Firm—Stallman & Pollock LLP

(57) ABSTRACT

In geodetic measuring systems and measuring devices (14) there exists a need to find and detect, rapidly and automatically, marker points to be measured that are provided with a marker (retro reflector) (2a). For the rapid detection, identification and determination of the horizontal angles of such a marker, even at greater distances, electromagnetic radiation in the form of a vertical fan (17) is transmitted by a transmitter unit (1) whose radiation is received, after reflection from the marker, by a receiving unit with a view field in the form of a vertical fan. By analyzing the signal strength and the apparent object size, a plausibility test and a reliable suppression of foreign or interference markers can be achieved. Such a marker searching device is marked by a selective analysis of specific characteristics of a marker detected. On the basis of the plausibility test, a rapid, certain and robust location of markers is possible.

66 Claims, 7 Drawing Sheets

PROCESS AND DEVICE FOR THE AUTOMATIC LOCATION OF REFERENCE MARKERS

BACKGROUND OF THE INVENTION

1. Field of the Invention

This invention relates generally to surveying and geodetic measurements, and relates more particularly to a process and device for the automatic location of a reference marker, a receiver unit, a geodetic measuring device, and geodetic measurement systems.

2. Description of the Relevant Art

For a long time, there has existed the need, in connection with geodetic measurements, for automatically recognizing geodetic reference markers to be measured and located in the field, and, if possible, at the same time, obtaining a rough measurement. This necessity is even greater as a result of the tendency toward fully automatic integrated measuring systems.

Optical-electronic devices for the automatic location of geodetic reference markers or a retro reflector or a reflection foil are corresponding already used in various embodiments. Devices of this type thereby supplement the usual sensory measuring means usually employed in geodetic measuring work. The combination of a motorized theodolite with automatic marker detection provides substantial advantages.

Devices for finding markers and, therefore, also the present invention involve all measuring devices that are optically pointed to measuring points through directing means handled by humans.

The concept "geodetic measuring device" in this connection should generally be understood to be a measuring instrument that has devices for measuring or checking data with spatial references or also for pointing. Especially, this involves the measurement of distances and/or directions or the angles to a reference or measuring point. In addition, however, additional devices, for example, components for satellite-supported location determination (for example, GPS or GLONASS) may be present, which can be used for measurements in accordance with the invention. Here, geodetic measuring devices should be understood to mean theodolites, level or total stations, tachymeters with electronic angle measurements, and electronic optical distance measuring devices. Similarly, the device is suitable for use in specialized devices with similar functionality, for example, in military aiming circles or in industrial construction or process monitoring. These systems are thereby also included under the concept "geodetic measuring device."

Automated theodolites commonly used today, as an example of a geodetic measuring device, are not only equipped with angle and distance sensors, but also with an optical-electronic marker seeking positioning and marker point measuring device, hereinafter called automatic marker locating unit (AZE). Such theodolites are capable of moving directly to the marking point and measuring the spatial coordinates. When operating perfectly, the time saved with such automated instruments is substantial. If, in addition, the system can be operated through remote control, for example, from the marking point as a one-man station, then the work efficiency and the savings in cost achieved thereby is even greater.

An essential component of these automated measuring instruments is AZE. Various solutions are known, such as CCD or CMOS cameras with image processing, optical-electronic position-sensitive semiconductor detectors (PSD); 4-quadrant diodes, acoustical-optical beam scanners, etc.

The primary function of this AZE includes the exact measurement of a reference mark or a reflector precise to the millimeter, over short and long distances, where distances in excess of 1000 m can also be measured. In order to achieve this mm precision, the seeking devices have the disadvantage of a limited sensor site view field. Only in the case of small to medium view fields of a few degrees can point precisions of <5 mm be achieved at 1000 m.

A substantial disadvantage of a small sensor view field is that the search for the marker is rendered more difficult, since the reference mark to be measured is often outside the view field at the beginning of a measurement. In many applications, especially in the short distance range, which does with a broad angle working field, an expanded sensor view field is advantageous.

Today, two methods are used in searching for markers. In one method, the sensor seeks the marker independently following a programmed algorithm or procedure; however, this takes time, due to the small field of view. In the second method, the search field is defined by the user, so that marker search proceeds in a more directed manner and takes less time; however, this has the disadvantage that the search field configuration must be reprogrammed every time the position changes.

A further disadvantage exists in following moved markers. In the case of tangential movements that are too rapid or jerky for the marker guidance of the automatic theodolite, it can occur that the marker leaves the view field of the marker detection device. Even a loss of the marker for a short time can then interfere with an efficient following process.

Further deficiencies in the case of devices with AZE in the state of technology are also the lack of robustness in the recognition of markers in the case of reflections by foreign markers. Foreign markers are those with a high degree of reflectivity, such as traffic signs. In marker recognition, the identification of the marker to be measured has not to date been satisfactorily solved, since especially the lack of robustness in solar reflections on objects with shiny surfaces has a disadvantageous effect.

While solar reflections on objects can be recognized with modern equipment, nevertheless the analysis necessary for this takes time, as a result of which the search process comes to a halt at every reflection.

In the case of rough-search sensors of the state of technology, due to the small sensor view field, the rough marker search requires too much time. The small view field, therefore, has effects that are out of proportion. In the first place, it has a smaller area of coverage of the environment, so that examining the search range requires a longer period of time. Secondly, the coverage must be done with a slower scan speed due to the shorter time that the object remains in the view field. A fan shape for the detection area of the sensors is, in this regard, more suitable, however the view fields, made up of fan angles of typically 1 to 5 degrees, is still much to small.

From the patent CH 676 042, a device is known with a fan-shaped transmitter and receiver, which is housed in a rotating measuring head. Light pulses are transmitted in a light fan from the transmitter unit; the reflected impulses are correspondingly evaluated with respect to angular information. However, this device has a substantial disadvantage of selecting not only the markers to be measured, but also outside interference objects. Such objects are, among other things, optically reflecting objects such as plate glass windows or traffic signs, and even sunlight reflected from motor vehicles.

An extension of the above marker search device for the rough determination of the marker coordinates is described in CH 676 041. In this case, a combination with an optical-electronic device is made for fine measurement. The actual marker search device sets up two fans that are perpendicular to each other, with which the location of the marker point is measured roughly. The subsequent fine measurement can then be carried out with the second device without the marker search procedure. The disadvantage of this combination is also the lack of robustness with respect to an erroneous locking in on foreign objects.

A further device is known from U.S. Pat. No. 6,046,800. A motorized theodolite, which is equipped with a sensor to detect the marker point coordinates, is revealed, consisting of one or two fan-shaped transmission bundles and two optical receiver channels. A special characteristic of this device consists of the fact that the optical axes of the transmitting channel and the two receivers lie triaxially in a single plane. This makes it possible to differentiate between normal reflecting and retro reflecting objects in a rotational or searching movement of the theodolite by evaluating the sequence over time of the two signals received. This method of pupil division on the receiver side, however, has the disadvantage that this differentiating characteristic exists only at short distances; in addition, the device is expensive, due to the two receiving channels.

From patent DE 196 23 060, a geodetic device for rough marker search is also known. This device consists of an optical-electronic vertical angle searcher essentially formed as a scanner. Transmitted and received beams are rotated around a (second) horizontally placed motor-driven axis. The intended result is a great range that is achieved on the basis of the parallel collimated optical bundles; this property is, however, purchased with the disadvantage of the point-type and therefore sequential and time consuming probing of the space. In the search process, the rapid vertically rotating sensor beam is simultaneously rotated slowly in the horizontal direction. A further disadvantage is the need for a supplementary angle measuring system on the scanner axis for the rough determination of the vertical angle. On the other hand, if the space were searched with a fan-shaped optical measuring bundle, then only a one-dimensional rotational movement around an axis would be necessary.

A substantial disadvantage of all previously known devices is the insufficient robustness against strongly reflecting foreign objects that can be mistakenly interpreted as marker objects, as well as interference with or at least the delay of the search process as a result of bright sunlight or reflections of the sun.

In most cases, the search process is supported manually through voice radio or data radio. In the device described in document DE 197 334 91, an additional optical receiving unit attached to the market object is used to check whether the search beam of the theodolite is hitting the marker object. If the corresponding search signal is being received, then the marker object reports its identification to the theodolite using data radio. This solution, while robust, affects the ergonomics at the marker object.

The problems to be solved by this invention consist of an improvement of the sensor devices defined above.

In this regard, one problem consists of providing a geodetic measuring device for the rough search of the marker, which is suitable for locating and identifying, as rapidly as possible, marker objects and determining rough coordinates, and which has a shorter searching time with a range of up to 1000 m. The speed of the search for the marker is a main problem, since it demands a large sensor viewing field, which can be achieved by a corresponding wide fan angle. As fan angles become larger, however, the range decreases. The problem to be solved by the invention is therefore to achieve the range of geodetic applications and simultaneously a high search speed.

A further problem consists of making possible a search process that is robust against foreign light and self-reflection at foreign markers. The search process, at the same time, cannot be delayed or interrupted by foreign markers with a high degree of reflection or by items with solar reflections. At the same time, the problem includes the simultaneous identification of the marker objects to be measured on the basis of suitable identification characteristics, even during the search process.

SUMMARY OF THE INVENTION

These problems are solved in accordance with the present invention. This invention substantially concerns an optical-electronic marker search device consisting of a fan-shaped transmitting channel that irradiates the marker to be located, a fan-shaped receiving channel that receives light reflected from the marker object, a motorized measuring device, for example, a theodolite, which moves around one of the two axes during the search process, at least one electronic evaluating unit to determine the rough location of the marker point, signal strength of the reflected signal, the width of the marker object in the scanning direction, and the distance to the marker object. Optically, the duration of the reflected optical signal can also be determined.

Both the planes of the two optical-electronic light fans and the axis of rotation of the theodolite (=scanning axis for the search procedure) are oriented parallel to each other. In the following, the concepts of the horizontal and vertical motion are to be understood in such a manner that the corresponding components and a corresponding movement are present in a movement. A horizontal movement of the transmitter unit can therefore especially also be achieved by a movement tilted toward the horizon.

A powerful and sensorily sensitive running time measuring device serves as a marker search device. Suitable running time meters with pulse modulation have a great range and a short measuring time. The attainable optical transmission powered with pulse laser diodes only millimeters in size is over 100 Watts. This makes it possible to achieve the range required for geodetic applications even with fan-shaped spreading of the transmitted beam. During a search run, the running time meter is operated in the continuously measuring mode. In this regard, the transmitter sends out optical impulses at a rate in the kHz range. Since the device is run in the single-shot evaluation process, information concerning the scanned environment is available in the nanosecond to microsecond range. The pulses received are probed with a rapid AD converter, which provides an intensity image of the environment. At the same time, the pulses probed can, for example, be stored in a 2D memory and evaluated later or a first analysis may be made soon and the further evaluation based on these first results which, for example, can be a bringing together or concatenation of the pulses.

The dimensioning of the optical transmitting fan is done in such a manner that it covers the environment typically to be measured in the vertical direction. The divergence in the direction perpendicular to the fan is preferably narrow, limited by diffraction.

A search with a device in accordance with the invention provides, as an output, an intensity image of the environment searched. The two-dimensional intensity image can be evaluated after the scan is completed or even simultaneously or soon after the recording. Possible results of such an evaluation can be, for example intensity maxima of any marker objects, a time for finding the marker or the equivalent angles to the marker object, or the distance to the marker object.

The robustness vis-à-vis solar reflecting surfaces and reflecting distant markers is improved or attained only by using the invention. Due to the strong laser pulse, solar reflecting surfaces are not visible in the two-dimension intensity image for two reasons. First of all, the laser radiation of the transmitters is of a narrow spectrum and a comparatively narrow interference filter in the reception process blocks the sunlight to a great extent. Secondly, the pulse lasers generate strong light flashes whose density of radiation is greater than that of solar reflections. Robustness against solar reflective surfaces is thereby achieved.

The necessary robustness against foreign or interference markers is more difficult to achieve. At first, in the two-dimensional intensity image, in addition to the actual marker object to be located, there often appear further optically reflecting objects.

In the near range under 10 m, the problem can be solved by a special biaxial arrangement of the two optical fans. Transmitter and receiver are biaxially next to each other, where the sideward displacement is perpendicular to the fans. The view fields of the transmitter and receiver do not overlap below 10 m as a result. Single reflecting objects, such as mirrors, are not seen in this distance range by the receiver, only retro reflecting marker objects with a sideward displacement of the reflected beam such as, for example, the triple prisms common to measuring work generate a measurable received signal. As a result of this, the robustness below 10 m is solved by the biaxial arrangement.

At all other distances, the real marker objects must be identified from the objects included in the two-dimensional intensity image in accordance with the invention.

Any marker object generates both a characteristic signal process and a characteristic width as a function of the distance. The identification of marker objects is therefore possible using two distance-related measurement curves. For the object distance measured in each case, the width of the object and the signal strength are checked to determine whether they are within the tolerance range of the marker object sought. Depending on concrete marking parameters and measuring conditions, it may be sufficient to perform only a comparison with respect to a limit value, for example, a comparison with the lower limit value with respect to the signal and with the upper limit value with respect to the object size.

If, during a scan, a reflected object is irradiated, then the signal and the object width are continuously compared to the tolerance values loaded. As soon as the transmitter fan has completely covered an object and all measured values lie within the tolerance limits, a marker object is identified and found. Depending upon application, the search process is stopped at the point or the coordinates, optionally along with parameters such as signal and width, are stored and the search process is continued without interrupting the scan so that further marker objects can be sought and found.

The case, which is entirely possible, that at certain fan settings multiple marker objects occur simultaneously at different distances can be handled without a problem on the basis of distance measurements.

In many applications, immediately after the instrument setup, the entire environment is scanned. This generates a two-dimensional intensity image, which contains all strongly reflecting objects. The coordinates of the irrelevant market objects, such as interference and foreign markers, are calculated and stored. With the knowledge of the coordinates of all interfering objects and foreign markers, these can be blocked out of further search runs. As a result, this makes it possible to save additional searching time, since the objects irrelevant to the measuring task no longer exist from a sensory point of view.

When a marker object is found, the distance and one direction coordinate are known. Next, the second spatial direction is measured. This is achieved according to the known search procedure with the automated marker locating unit (AZE) present in the theodolite. The AZE search and measurement procedure is very efficient and rapid in this case, since only 1-dimensional movement or travel is necessary. The combination of the two devices results in a further advantage. Since the AZE measures the position of the marker object precisely to angular seconds, at the end of the AZE search and measurement process the marker point coordinates are known not only roughly, but with geodetic precision in the millimeter to sub-millimeter range.

The combination of the marker search device with an automatic marker locating unit (AZE), in accordance with the present invention, makes possible the complete and mm-precise determination of the 3D coordinates of marker objects.

An essential property of the process and the device in accordance with the invention is the speed of the search process. A complicating factor lies in the large signal dynamic resulting from the geodetic distance range.

In a device according to the invention, this problem is supported or solved by measures taken on the transmitter side. The high signal dynamic can be allowed for by transmitting multiple laser pulses of differing intensity. The signal dynamic is thereby divided onto transmitter and receiver. In the short-distance range, the receiver evaluates the weak pulses with lower amplitude in the long-distance range, the strong pulses with higher amplitude.

A suitable application of the device in accordance with the invention is represented by modular integration in a motorized theodolite with automatic marker locating unit (AZE) according to patent U.S. Pat. No. 6,031,606.

The process according to the invention as well as a device according to the invention and a geodetic measuring device according to the invention are described in greater detail in the following, on the basis of the sample embodiments schematically represented in the drawing, purely as an example.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE PREFERRED EMBODIMENTS

The drawings depict various preferred embodiments of the present invention for purposes of illustration only. One skilled in the art will readily recognize from the following discussion that alternative embodiments of the structures and methods illustrated herein may be employed without departing from the principles of the invention described herein.

Figure 1A:
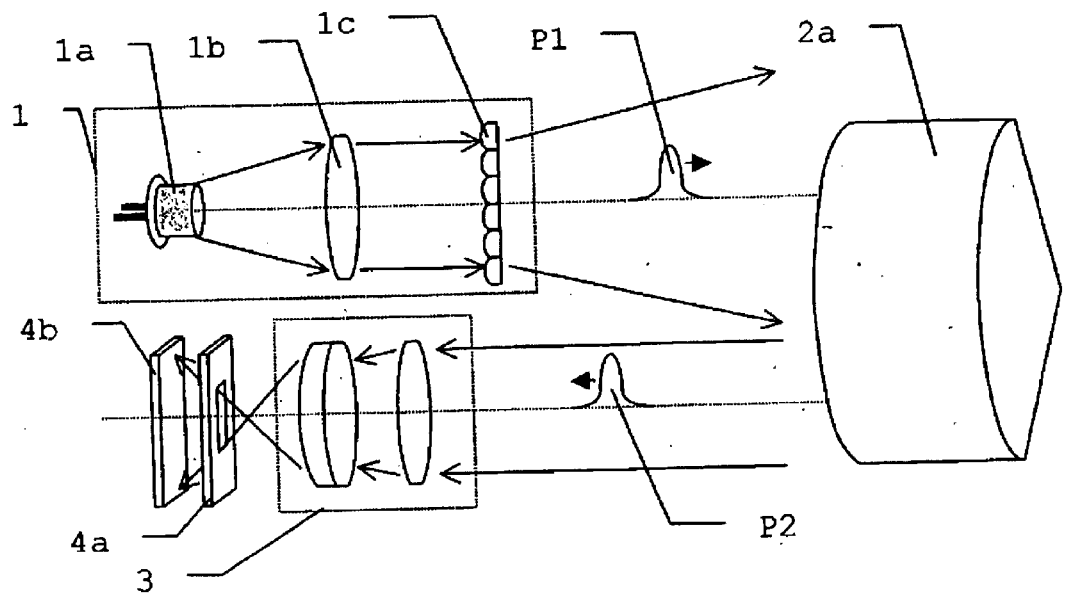
FIGS. 1a–b are representations of the principles of two embodiments of the process and device of the present invention, with vertical fans and single as well as double pulse modulation.
Figure 1B:
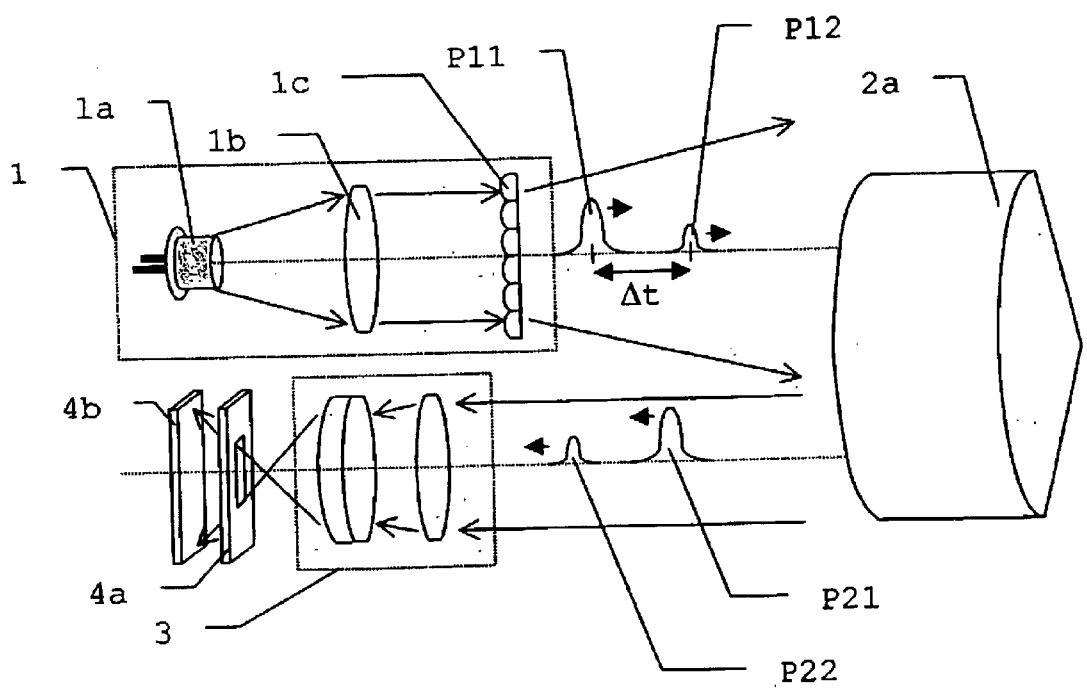

FIGS. 1a–b show two possible embodiments of a device in accordance with the present invention to carry out the procedure according to the invention.

In FIG. 1a, a pulse laser diode 1a is a transmitter diode with pulse modulation that generates electromagnetic radiation with pulses P1 as a signal. A suitable pulse duration is, for example, 50 nanoseconds. The strong signals generated thereby with optical powers in the Watt range are robust against foreign light reflections. Even sunlit reflective surfaces are therefore weaker than the signal pulse received.

The radiation generated is emitted in a vertically oriented fan, which on the side of the device is generated by a combination of a lens 1b and a cylindrical lens array 1c. Alternatively, however, any other suitable components can be used, such as, for example, micro lens arrays or diffractive optical elements. After the emission and a reflection by a marker, which, for example, includes a retro reflector 2a as an example for a suitable reflector, reflective pulse P2 is again received by the device.

In this regard, on the receiver side, the fan-shaped view field is achieved by means of a slit aperture 4a before a receiver diode as a photosensitive element 4b, together with an objective 3 with cylindrical effect.

In the second embodiment represented in FIG. 1b, on the side of the device in the transmitter unit 1, the same components of pulse laser diode 1a, lens 1b and cylinder lens array 1c are used. However, now, as an example, two laser pulses with differing intensities are transmitted. Here, also, the pulse rate is in the kHz range. The radiation emitted now has a pulse P11 with a higher maximum pulse height and a pulse P12 with a lower maximum pulse height, which follow each other sequentially, and thus, in this embodiment, represent a double pulse.

After reflection from the marker, which again has a reflector 2a, the reflected pulses P21 and P22 are detected by the receiver unit. This again consists of an objective 3 with cylindrical effect and a slit aperture 4a before a receiver diode as a photosensitive element 4b.

Upon reception of the pulses of different intensity, the pulse that lies in the receiving dynamic range of the receiver is evaluated. In this example, for a shorter measuring distance whose limit, for example, may be 20 m, the reflected pulse P22 with the lower pulse height is used, and for a greater measuring distance, the reflected pulse P21 with the higher pulse height is used.

Figure 2:
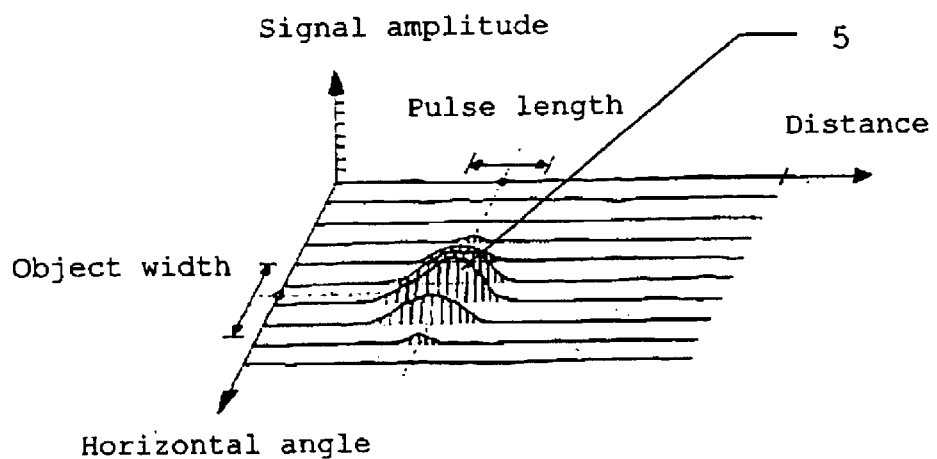
FIG. 2 is an extract from a two-dimensional intensity image of a marker object for a process in accordance with the present invention.

FIG. 2 shows schematically a section of a two-dimensional intensity image with a marker object. The individual signal pulses 5 detected by the receiver are detected as a function of the time of their emission, with time triggered probing. At each laser pulse, a further signal track is created in the intensity image, along the distance axis. With time triggered probing, assignment is made with respect to distance and the emission times determine the horizontal angle associated with the signal track.

Now, by analyzing the detected progress of the signal strengths, objects can be identified in the two-dimensional intensity image and their object width and distance measured. Markers and foreign markers or interference effects are differentiated through a plausibility test.

Figure 3:
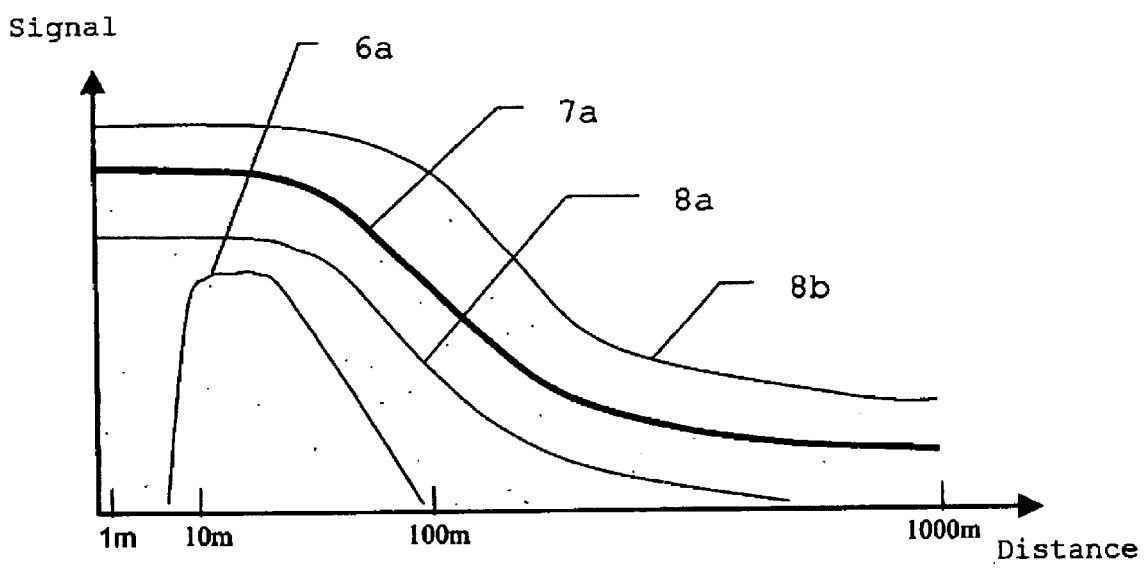
FIG. 3 is a schematic representation of the application of a plausibility band (tolerance value table) for signal amplitude.
Figure 4:
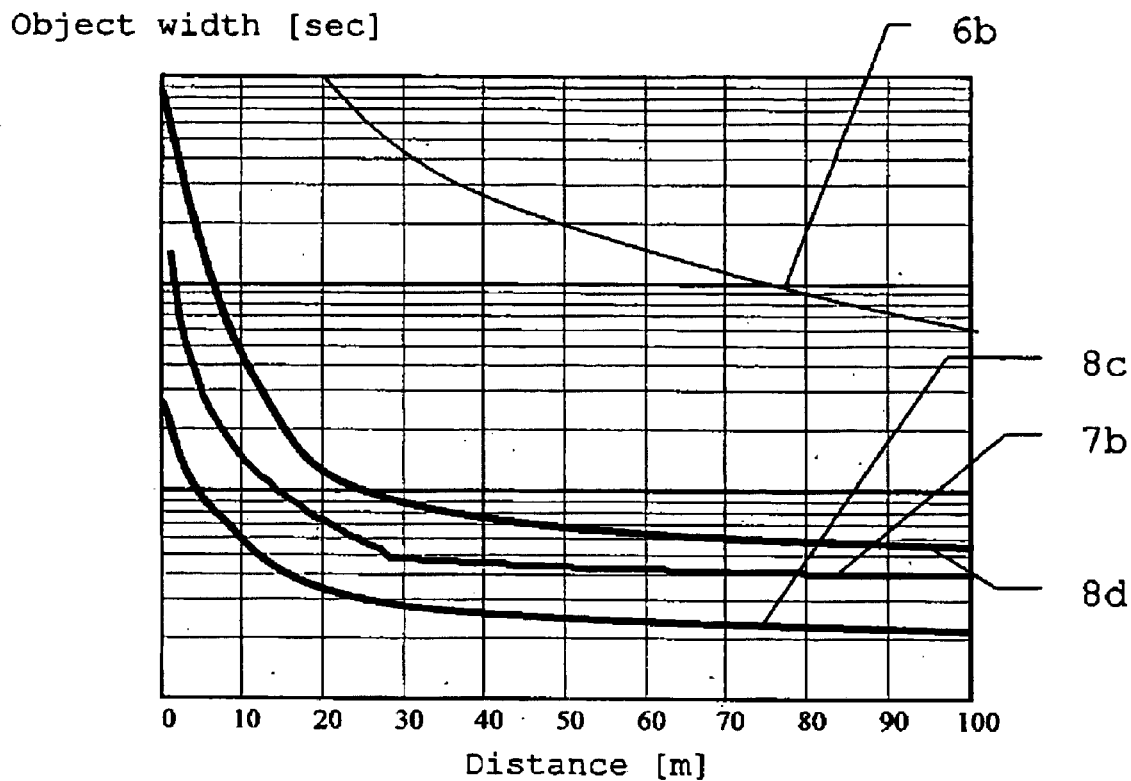
FIG. 4 is a schematic representation of the use of a plausibility band (tolerance value table) for the apparent size of the object (object width).

FIG. 3 and FIG. 4 show schematically the performance of such a plausibility test for the recognition of markers. The basis of the plausibility test is the signal distance model and the object width distance model (tolerance value tables). The object width or object extension is calculated on the basis of the product of the number of pulses and angular speed. Additionally, it is possible to take into account or calculate the reflectivity of the marker.

The object extension is an important recognition characteristic, since traffic signs always have greater reflective surface than the actual markers. An individual, specific tolerance value table can be kept for these object-specific characteristics for each marker type. At the same time, freely selectable tolerance value tables can be used for special user-specific markers. Also, alternative or supplementary plausibility tests based on other criteria can be performed. For example, where appropriate, spectrally different reflectivity of different objects can be analyzed.

FIG. 3 shows an example of a plausibility test with respect to the signal amplitude using a plausibility band (tolerance value table). The plausibility test is performed by testing whether a measured value of a marker lies within a plausibility band which is defined in each case by a lower tolerance limit 8a and an upper tolerance limit 8b. The theoretical curve of all values of a marker is then represented by the distance-dependent profile 7a. For example, if a value for a foreign marker should lie on its profile, such as, for example, the profile 6a of a traffic sign, and therefore outside the plausibility band, it therefore would be identified as a foreign marker.

Depending upon the concrete situation, such as, for example, the characteristic of the marker and of the possible foreign marker, it can be sufficient to work with only one tolerance limit, if this assures a safe division of the marker and foreign markers.

Another procedure for plausibility checking with regard to the apparent object size, again using a plausibility band (tolerance value table), is represented in FIG. 4. What is represented is a tolerance value table that contains the apparent object width in time units, with a logarithmic scale in the case of a horizontal scan of the measuring device for the different distances, in which a marker-may be found. A measured apparent extension for a marker for which again the theoretical profile 7b is represented reflects the apparent extension in the horizontal direction. Here also, a test is made as to whether the measured value is within the plausibility band defined by the lower tolerance limit 8c and the upper tolerance limit 8d.

A value for a foreign marker width, for example, would lie near its theoretical profile 6b and therefore outside the plausibility band.

Figure 5A:
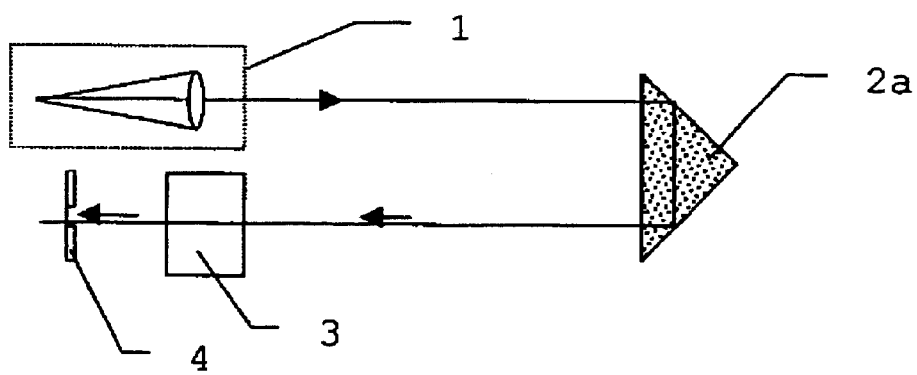
FIGS. 5a–b are representations of the differing conditions for the biaxial property of the transmitting unit and receiving unit for the transmitted beam that is preferably limited in diffraction with a retro reflector and with a singly reflecting object.
Figure 5B:
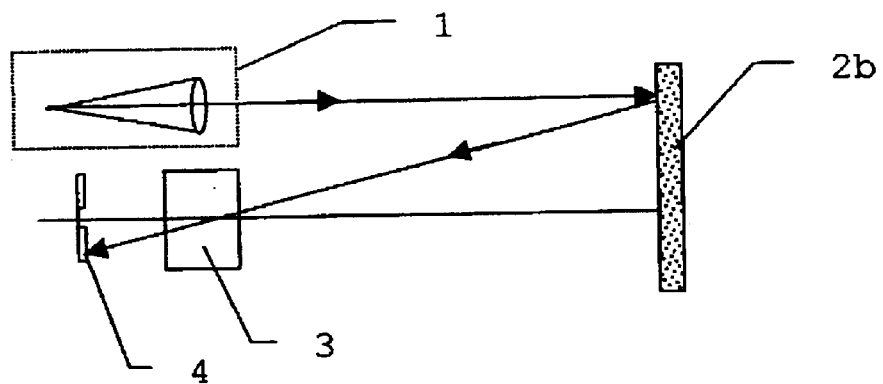

FIGS. 5a–b show the conditions in the reflection of the pulse emitted at a retro reflector, as compared to the reflection from a foreign marker for the short range.

FIG. 5a shows a schematic representation of the reflection from a retro reflector 2a at short range. The view fields of the transmitter unit 1 and the receiver unit that contains objective 3 and detector 4 are placed biaxially so that they do not overlap in the near range below 5 m and as a result are robust against foreign objects without retro reflection. The radiation from the transmitter unit 1 is reflected by the retro reflector 2a with a parallel offset and therefore can be received in the axis defined by the objective 3 and the detector 4 of the receiving unit.

The situation that deviates from this in the case of reflection from a foreign marker 2b is shown in FIG. 5b. The foreigner marker does not lead to a parallel offset of the radiation emitted by the transmitter unit 1, so that it cannot be received in the axis defined by the objective 3 and the detector 4. A biaxial placement of the view fields of the transmitter unit 1 and the receiver unit therefore makes it possible to suppress the detection of foreign markers for the short range.

Figure 6A:
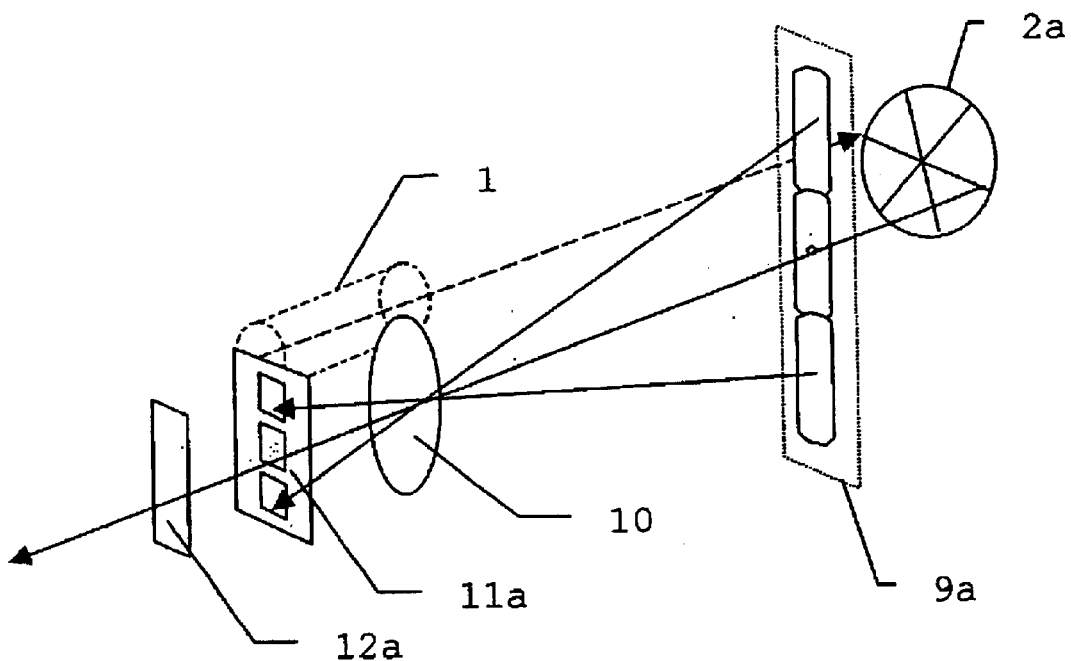
FIGS. 6a–c are representations of various embodiments of the receiver unit according to the present invention, with a structured fan, a horizontal fan tuft, and a two-dimensionally structured view field.
Figure 6B:
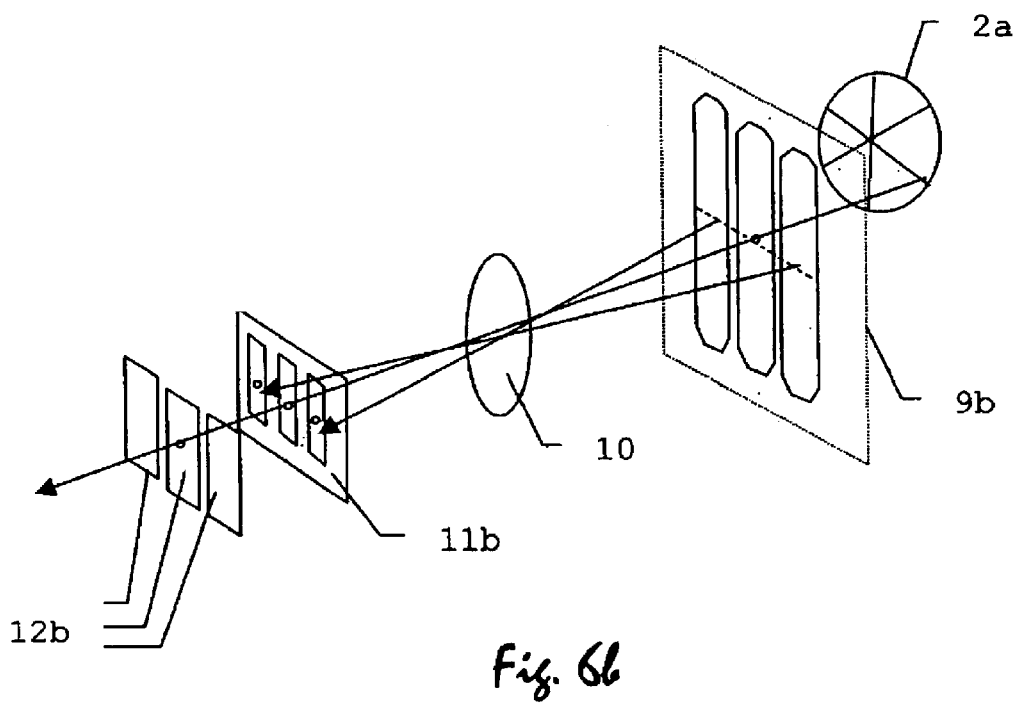
Figure 6C:
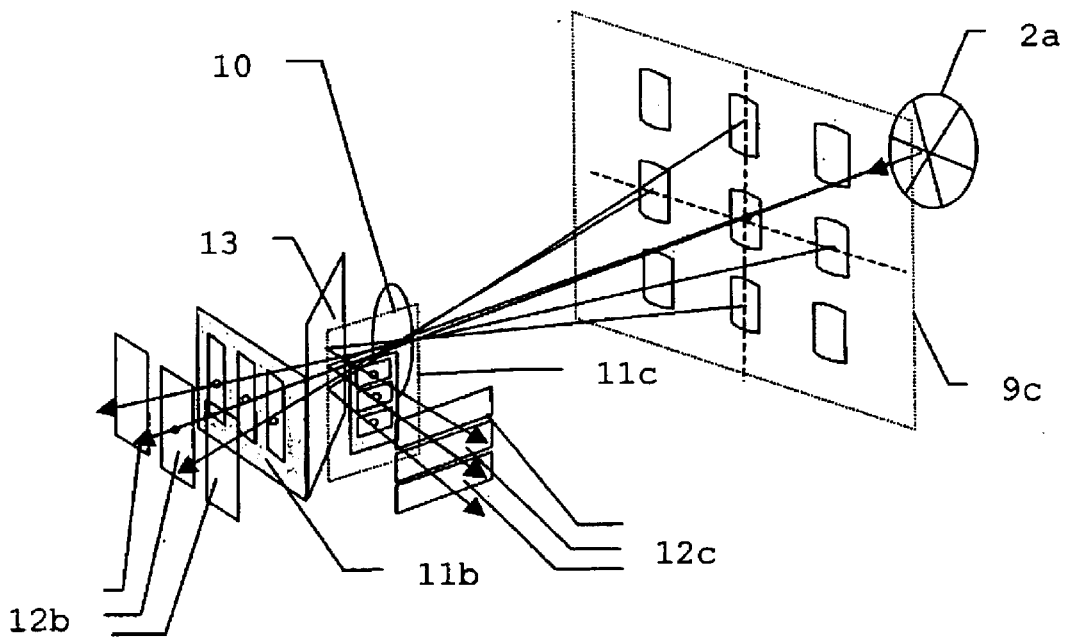

In order to shorten the search time still further, multiple embodiment forms are possible on the receiver side. The fan-shaped view field can be subdivided into multiple sectors; alternatively multiple fans next to each other can be used. FIGS. 6a–c therefore show alternative embodiments of a receiver unit according to the invention, with structured fans, a horizontal fan tuft, and a two-dimensionally structured view field. In all examples, the sensor fan is divided into segments on the receiver side. As a result, a rough spatial position determination is possible in the fan direction as well.

FIG. 6a shows the structuring of the fan of the receiver unit. The radiation emitted by the transmitter unit 1 and reflected from a retro reflector 2a is now received by means of a subdivision of the receiving fan, with additional location information. This subdivision of the fan 9a into multiple sectors can be achieved by means of a slit aperture 11a at the first focal point of the cylindrical receiver optics. In the embodiment represented in FIG. 6a, a switchable slit aperture can be used in which optionally the transmission from the relevant slit can be changed. The photosensitive element 12a is placed in the area of the second focal level in order to cover the view field of the receiver optics 10 in the spatial direction perpendicular to the fan with high transmission. The slit aperture 11a divides the receiving fan into, for example, three sectors, which makes possible a rough positioning, even in the vertical direction. The radiation coming from the retro reflector 2a passes through the central opening of the slit aperture 11a in the example represented, so that a rough estimate of the angle range in the vertical direction can be made.

A different embodiment of the receiver unit, according to the invention, with multiple fans, is shown in FIG. 6b. The generation of multiple receiving fans placed next to each other as a fan tuft 9b is done by using a structured photosensitive receiving surface 12b at the second focal level, especially in connection with a slit aperture 11b structured in the same arrangement. This subdivision of the photosensitive receiving surface 12b, for example in a linear array of photo detectors, thereby generates a tuft (cluster) of search fans placed next to each other. As an example, three fans are represented here; a different number of fans can be achieved through the choice of a suitable subdivision. Thus, especially tufts (clusters) with two or four fans can be achieved. The central fan of this example, which is parallel to the transmission axis, reacts to the retro reflector 2a, the fan turned toward the transmitter axis reacts to objects with single reflections, the third fan reacts only to sunlight reflections. A structured photosensitive receiving surface 12b therefore increases the certainty of correct identification of reflective objects.

A receiver unit according to the invention with two-dimensional structuring of the view field is represented in FIG. 6c. Through the combination of two structured PIN diodes, whose structuring alignment in the right-hand angle is oriented toward each other, the view field can be subdivided two-dimensionally. The radiation detected by the receiving optics 10 with its view field is fed through a beam splitter 13 onto two different detectors. The first detector consists of a vertically structured photosensitive receiving surface 12b and a corresponding slit aperture 11b in the second focal plane. The second detector consists of a horizontally structured receiving surface 12c with associated slit aperture 11c in the first focal plane. As a result of this structuring oriented perpendicularly toward each other, the view field is divided horizontally and vertically, so that from this a tuft (cluster) of restructured fans results. In this example, with two PIN diodes lying side by side, retro reflection and the usual mirror reflection can be received with supplementary directional information and therefore can be differentiated.

All suitable forms of location-sensitive detectors such as, for example, receiving diodes or receiving diode arrays or PSD's may be used as the described photosensitive elements 12a and receiving surfaces 12b and 12c.

Figure 7A:
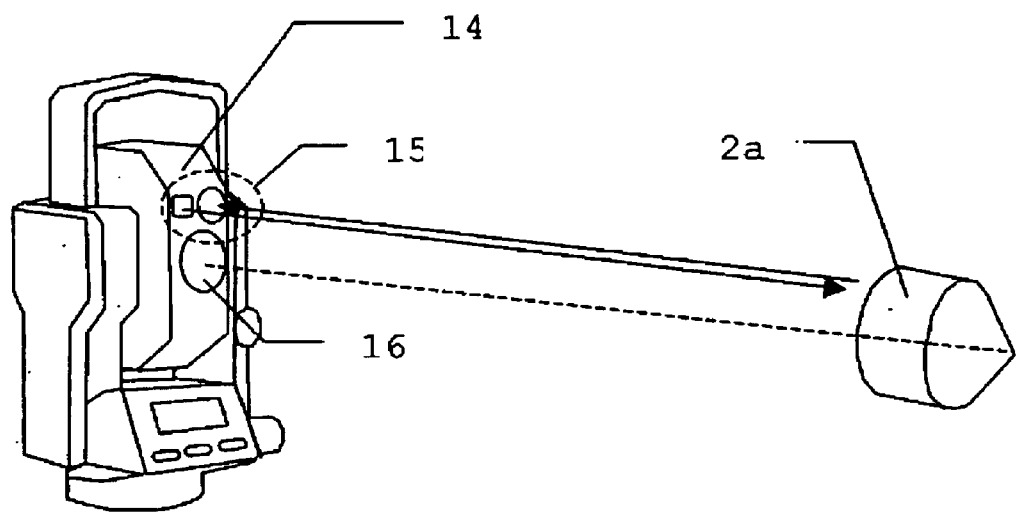
FIGS. 7a–b are perspective representations of an automated geodetic measuring device according to the invention, and the combination of the search process with AZE.
Figure 7B:
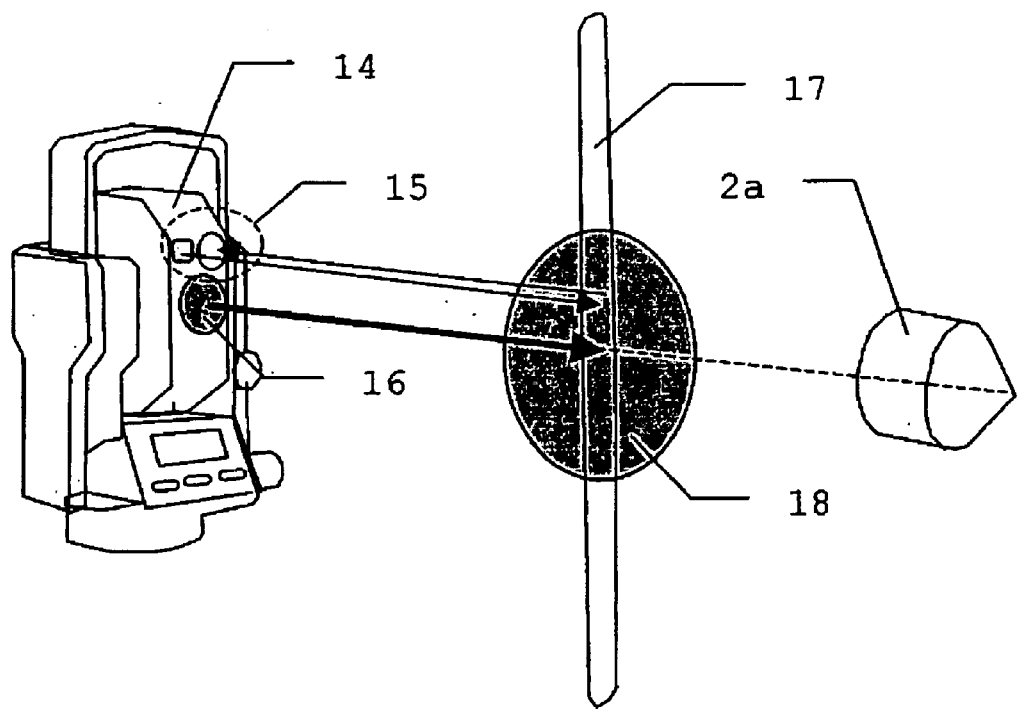

The combination of a device 15 according to the invention, with an AZE system 16, is represented together with the schematic progress of the process in FIGS. 7a–b.

FIG. 7a shows the structural integration of a device 15 according to the invention and an AZE system in a geodetic measuring device 14. In this, the device 15 supplements the AZE system 16 already present in a theodolite as a geodetic measuring device 14. The emission for the recognition of a retro reflector 2a as a marker by the device 15 according to the invention and the AZE system 16 takes place essentially parallel to each other in this example.

FIG. 7b shows the combination of both search processes schematically. The device 15 in accordance with the invention carries out a rapid area scan with a vertical fan 17 to determine the horizontal angle of a marker. In a short time (a few seconds), a retro reflector 2a as a marker is found and its placement determined roughly. The measuring data of the device 15 according to the invention can be forwarded for support to other sensors in the geodetic measuring device, thus, for example, to an AZE system 16. This AZE system 16 thereafter searches with its fan 18 also for the retro reflector 2a and therefore also determines the vertical angle. If the channels are separated from other optical sensors by means of suitable optical carrier wave lengths, then multiple sensors can be used simultaneously in the geodetic measuring device or multiple geodetic measuring devices can be used.

Figure 8:
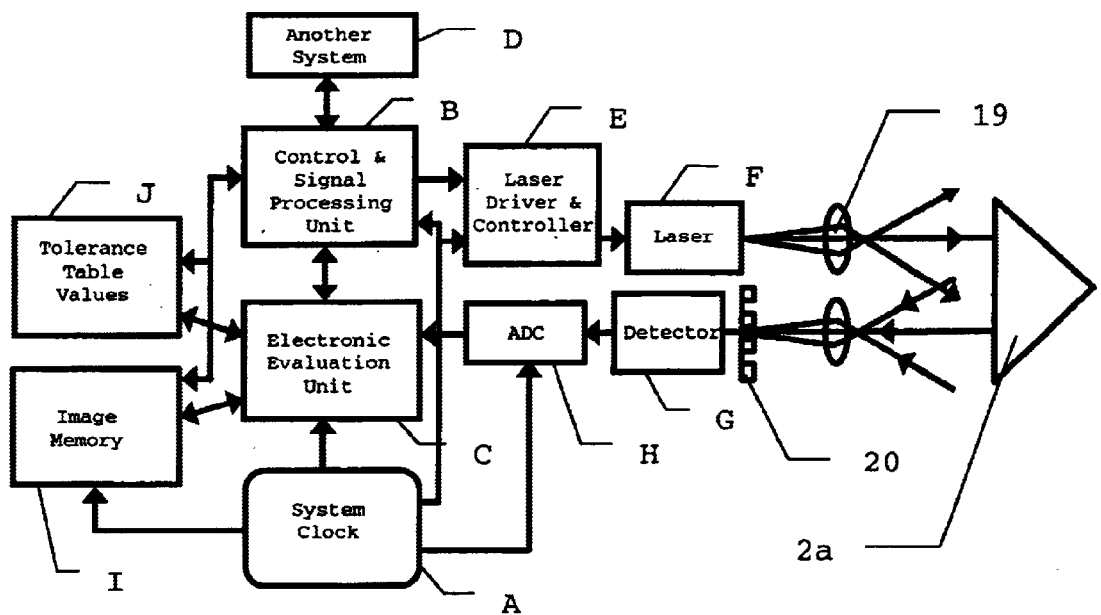
FIG. 8 is a block schematic as an example for a circuit-side embodiment of the device according to the present invention.

FIG. 8 shows a block diagram for a device in accordance with the invention. A system clock A, which is connected to the image memory I, the electronic evaluation unit C, the control and signal processing unit B, the analog-digital converter H and the laser driver and controller E, serves as a common time base. The laser F emits radiation, which is sent to a retro reflector through beam-shaping optics 19. After reflection, this beam is received and fed through an image-forming mask 20 to the detector G. The signal of this detector G is converted by the analog-digital converter H and processed further in the electronic evaluation unit C. This is connected to the control and processing unit B, the image memory I and the tolerance value tables J for all possible mark types. Through an interface, it is possible to connect to another system D, for example, a geodetic measuring device or the evaluation unit of a rotating device.

Figure 9:
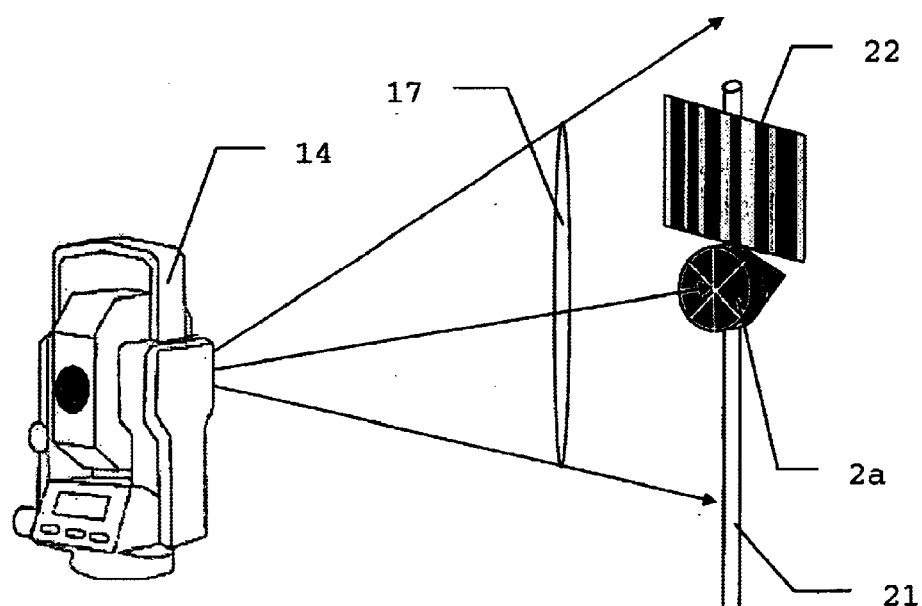
FIG. 9 is a perspective representation of the geodetic measuring system in accordance with the present invention.

In FIG. 9, a geodetic measuring system according to the invention, with automatic marker recognition using a bar code pattern on the marker, is shown. On a rod 21 of a marker, in addition to the marker, which here, as an example, is represented as a retro reflector 2a, there is additionally a coded marker board 22. The coding consists of optically strongly reflective strips that can be scanned sequentially in a search run. The vertical fan 17 illuminates a sufficiently large vertical angle, so that a parallel illumination and detection of the marker board 22 and the retro reflector 2a is possible. The signal received by the search sensor is amplitude modulated over time, so that the code of the marker board is transformed into a time sequence. As a result, it is possible to very rapidly search for the marker and identify the marker. Using a coordinate database, certain markers, as well as interfering objects, can be blanked out. Such points are not addressed. In the evaluation of the corresponding data image, the coded information from the marker board is also present, in addition to the object distance and object size.

It is understood that the figures represent one of many embodiments and an expert can derive alternative embodiments, for example, using other means for emission and reception of electromagnetic radiation or for signal detection or signal processing.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A process for automatically finding a reflective marker, said process comprising the steps of:
emitting electromagnetic radiation to illuminate the marker, wherein the electromagnetic radiation has a fan shape in a first plane that is movable through an angular range,
receiving electromagnetic radiation reflected from the marker within a detection range that has a fan shape in a second plane that is movable and coplanar with the first plane;
determining an angular position of the marker; and
detecting a running time of the electromagnetic radiation reflected from the marker as a measure of distance to the marker.

2. A process according to claim 1, wherein the emission of the electromagnetic radiation is in the form of a transmitting fan with an opening angle between 10° and 90° and with a divergence limited by diffraction perpendicular to the transmitting fan.

3. A process according to claim 1, further comprising a step of detecting an apparent object width from the reflected electromagnetic radiation and comparing the apparent object width to a characteristic parameter for the marker.

4. A process according to claim 1, further comprising a step of detecting a signal amplitude of the reflected electromagnetic radiation and comparing the signal amplitude to a characteristic signal amplitude for the marker.

5. A process according to claim 1, further comprising a step of performing a plausibility check of the reflected electromagnetic radiation by comparing an apparent object width to a characteristic parameter for the marker and by comparing a signal amplitude of the reflected electromagnetic radiation to a characteristic signal amplitude for the marker.

6. A process according to claim 5, wherein the plausibility check is performed by comparing the apparent object width and signal amplitude to a tolerance value table having values that define acceptable values of the apparent object width and signal amplitude.

7. A process according to claim 1, wherein the step of emitting electromagnetic radiation includes emitting at least one series of double pulses with differing amplitudes.

8. A process according to claim 7, wherein the step of detecting a running time of the electromagnetic radiation reflected from the marker is performed by detecting only one of the two pulses.

9. A process according to claim 1, further comprising a step of suppressing the detection of interfering objects and foreign markers.

10. A process according to claim 1, further comprising a step of determining a second angular position of the marker by a horizontal or vertical subdivision of the fan-shaped detection area.

11. A process according to claim 1, further comprising a step of determining a second angular position of the marker by an automatic marker detection unit.

12. A process according to claim 1, wherein the step of emitting electromagnetic radiation includes emitting electromagnetic radiation at two carrier wave lengths and the step of receiving electromagnetic radiation includes receiving electromagnetic radiation at the two carrier wave lengths.

13. A-process according to claim 12, further comprising a step of determining the position of the marker using both carrier wave lengths to check for plausibility of the measured position of the marker.

14. A device for automatically locating the position of a reflective marker, preferably for use in connection with a theodolite, comprising:
a transmitter having a means for illuminating the marker by emitting electromagnetic radiation in the shape of a fan in a first plane, wherein the first plane is movable through an angular range, a receiver placed biaxially to the transmitter and having an optical-electronic detector for detecting a signal reflected from the marker, wherein the detector has a detection range that has a fan shave in a second plane, wherein the second plane is movable through an angular range and is coplanar with the first plane;

time measuring means for determining the running time of the signals reflected from the marker as a measure of the distance of the marker; and angle measuring means for determining the angular position of the marker.

15. A device according to claim 14, wherein the first plane of the transmitter is oriented vertically and is rotatable through a full circle, and wherein the second plane of the receiver is oriented vertically and is rotatable with the first plane through a full circle.

16. A device according to claim 14, wherein the fan of the transmitter has a variable opening angle of between 10° and 90°, and wherein the divergence of the electromagnetic radiation perpendicular to the fan of the transmitter is limited by diffraction.

17. A device according to claim 14, wherein the transmitter includes at least one of the following means for generating the shape of the fan of the transmitter: a cylindrical lens, a micro lens array, or a diffractive optical element.

18. A device according to claim 14, wherein the transmitter includes means for emitting at least one series of double pulses with different amplitudes.

19. A device according to claim 14, further comprising means for plausibility testing of the signals received by the receiver by comparing the strength of the signal and the apparent object size with a tolerance value table.

20. A device according to claim 14, further comprising means for suppressing interfering objects and foreign markers.

21. A device according to claim 14, wherein the receiver includes at least one of the following means for generating a fan-shaped detection range: a cylindrical lens, a micro lens array with cylindrical effect, or a diffractive optical element.

22. A device according to claim 14, wherein the detector has a slit shaped aperture with a photosensitive element for subdividing the detection range into sectors.

23. A device according to claim 14, wherein the detector has a linear array of photosensitive elements and a corresponding array of slit apertures for subdividing the detection range into sectors.

24. A device according to claim 14, wherein the detector includes a beam splitter that splits the received signal into two beams, a vertical linear array of photosensitive elements and a corresponding vertical array of slit apertures aligned with one beam, and a horizontal linear array of photosensitive elements and a corresponding horizontal array of slit apertures aligned with the other beam.

25. A receiving unit for detecting and storing a signal reflected from a marker, comprising:

an optical-electronic detector for detecting an electromagnetic radiation signal reflected from a marker, wherein the detector has a detection range that is fan shaped in a vertical plane, and wherein the detector is movable through an angular range;

means for determining the running time of the signal reflected from the marker to measure a distance between the receiving unit and the marker;

a memory to store the signals received;

means for associating the received signals to a running time or a distance and storing the associated time or distance and a detector angle in a two-dimensional data structure.

26. A receiving unit according to claim 25, further comprising at least one of the following means for generating a fan-shaped detection range: a cylindrical lens, a micro lens array with cylindrical effect, or a diffractive optical element.

27. A receiving unit according to claim 25, further comprising means for suppressing electromagnetic radiation from interfering objects and foreign markers.

28. A receiving unit according to claim 25, wherein the detector has a slit shaped aperture with a photosensitive element for subdividing the detection range into sectors.

29. A receiving unit according to claim 25, wherein the detector has a linear array of photosensitive elements and a corresponding array of slit apertures for subdividing the detection range into sectors.

30. A receiving unit according to claim 25, wherein the detector includes a beam splitter that splits the received signal into two beams, a vertical linear array of photosensitive elements and a corresponding vertical array of slit apertures aligned with one beam, and a horizontal linear array of photosensitive elements and a corresponding horizontal array of slit apertures aligned with the other beam.

31. A geodetic measuring device, comprising:

a theodolite or level;

a first transmitter coupled to the theodolite or level and having means for illuminating a reflective marker by emitting electromagnetic radiation in the shape of a fan in a first plane, wherein the first plane is movable through an angular range;

a receiver placed biaxially to the first transmitter and having an optical-electronic detector for detecting a signal reflected from the marker, wherein the detector has a detection range that has a fan shape in a second plane, wherein the second plane is movable through an angular range and is coplanar with the first plane;

time measuring means for determining the running time of the signals reflected from the marker as a measure of the distance of the; and angle measuring means for determining a first angular position of the marker.

32. A geodetic measuring device according to claim 31, wherein the electromagnetic radiation emitted by the first transmitter has a first carrier wave length, and further comprising an automatic search device coupled to the theodolite or level and having a second transmitter to emit electromagnetic radiation with a second carrier wave length, wherein the automatic search device provides means for determining a second angular position of the marker, wherein the second angular position is orthogonal to the first angular position.

33. A geodetic measuring device according to claim 32, further comprising at least one marker that includes at least one reflector, wherein the reflectivities of the reflector are selected with respect to the first and second carrier wave lengths, and comprising means for recognizing the reflector according to the ratio of the reflected intensity from the first and second carrier wave lengths.

34. A geodetic measuring device according to claim 31 further comprising at least one marker that includes at least one reflector and at least one one-dimensional bar code having bars that are oriented parallel to the transmission fan or parallel to the fan-shaped detection range.

35. A process according to claim 1, wherein the step of emitting electromagnetic radiation includes pulse modulating the electromagnetic radiation at a pulse rate between 10 and 50 kHz.

36. A process according to claim 1, further comprising a step of storing the angular position and distance or running time in a two-dimensional data structure.

37. A process according to claim 36, wherein the two-dimensional data structure has angular position and distance or running time as index variables.

38. A process according to claim 1, further comprising a step of determining the maximum intensity of a received reflection.

39. A process according to claim 1, wherein the step of emitting electromagnetic radiation includes modulating the electromagnetic radiation at a first carrier wave length.

40. A process according to, claim 1, wherein the first and second planes are vertical.

41. A process according to claim 1, wherein the step of determining an angular position of the marker includes determining a horizontal angle of the marker.

42. A process according to claim 1, wherein the step of emitting electromagnetic radiation includes moving the first plane through a full circle.

43. A process according to claim 1, further comprising the steps of determining an actual marker by eliminating foreign markers and reflections from objects that are not markers, and then determining a second angular position of an actual marker.

44. A process according to claim 1, wherein the first and second planes are movable in rotation about an axis that is parallel to the planes.

45. A process according to claim 1, wherein the first and second planes are laterally offset, and wherein the reflective marker has a sideward displacement between an incident beam and a reflected beam that is substantially equal to the lateral offset between the first and second planes.

46. A process according to claim 8, wherein a pulse of lower amplitude is detected to determine the running time for shorter distances to the marker and wherein a pulse of higher amplitude is detected to determine the running time for longer distances to the marker.

47. A device according to claim 14, wherein the transmitter includes means for pulse modulating the electromagnetic radiation at a pulse rate between 10 and 50 kHz.

48. A device according to claim 14, further comprising means for storing the angular position and distance or running time in a two-dimensional data structure.

49. A device according to claim 48, wherein the two-dimensional data structure has angular position and distance or running time as index variables.

50. A device according to claim 14, further comprising means for determining the maximum intensity of a received reflection.

51. A device according to claim 14, further comprising means for modulating the electromagnetic radiation at a first carrier wave length.

52. A device according to claim 14, wherein the first and second planes are vertical.

53. A device according to claim 14, wherein the angle measuring means determines a horizontal angle of the marker.

54. A device according to claim 14, further comprising means for determining an actual marker by eliminating foreign markers and reflections from objects that are not markers, and means for determining a second angular position of an actual marker.

55. A device according to claim 14, wherein the first and second planes are movable in rotation about an axis that is parallel to the planes.

56. A device according to claim 14, wherein the first and second planes are laterally offset, and wherein the reflective marker has a sideward displacement between an incident beam and a reflected beam that is substantially equal to the lateral offset between the first and second planes.

57. A device according to claim 18, further comprising means for detecting a pulse of lower amplitude to determine the running time for shorter distances to the marker and means for detecting a pulse of higher amplitude to determine the running time for longer distances to the marker.

58. A device according to claim 31, wherein the first transmitter includes means for pulse modulating the electromagnetic radiation at a pulse rate between 10 and 50 kHz.

59. A device according to claim 31, further comprising means for storing the angular position and distance or running time in a two-dimensional data structure.

60. A device according to claim 59, wherein the two-dimensional data structure has angular position and distance or running time as index variables.

61. A device according to claim 31, further comprising means for determining the maximum intensity of a received reflection.

62. A device according to claim 31, wherein the first and second planes are vertical.

63. A device according to claim 31, wherein the angle measuring means determines a horizontal angle of the marker.

64. A device according to claim 31, further comprising means for determining an actual marker by eliminating foreign markers and reflections from objects that are not markers, and means for determining a second angular position of an actual marker.

65. A device according to claim 31, wherein the first and second planes are movable in rotation about an axis that is parallel to the planes.

66. A device according to claim 31, wherein the first and second planes are laterally offset, and wherein the reflective marker has a sideward displacement between an incident beam and a reflected beam that is substantially equal to the lateral offset between the first and second planes.

* * * * *